(12) United States Patent
Liu (10) Patent No.: US 8,959,192 B1
(45) Date of Patent: Feb. 17, 2015

(54) USER-CONTEXT MANAGEMENT

(75) Inventor: Kevin H. Liu, Edison, NJ (US)

(73) Assignee: EMC Corporation, Hopkinton, MA (US)

( * ) Notice: Subject to any disclaimer, the term of this patent is extended or adjusted under 35 U.S.C. 154(b) by 726 days.

(21) Appl. No.: 12/638,137

(22) Filed: Dec. 15, 2009

(51) Int. Cl.
*G06F 15/16* (2006.01)
*G06F 15/173* (2006.01)
*H04L 29/08* (2006.01)

(52) U.S. Cl.
CPC ............ *H04L 67/30* (2013.01); *H04L 67/24* (2013.01)
USPC ........................................... 709/223

(58) Field of Classification Search
CPC ............ H04L 29/08918; H04L 29/08936; H04L 29/086484; H04L 63/20; H04L 67/30; H04L 67/306; H04L 67/24
USPC ........................................... 709/223
See application file for complete search history.

(56) References Cited

U.S. PATENT DOCUMENTS

| | | | |
|---|---|---|---|
| 6,691,118 B1 | 2/2004 | Gongwer et al. | |
| 6,933,556 B2 * | 8/2005 | Endoh et al. | 257/315 |
| 6,941,313 B2 | 9/2005 | Seliger et al. | |
| 6,993,556 B1 * | 1/2006 | Seliger et al. | 709/203 |
| 7,046,263 B1 * | 5/2006 | Abbott et al. | 715/740 |
| 7,076,504 B1 * | 7/2006 | Handel et al. | 705/14.39 |
| 7,577,743 B2 * | 8/2009 | Fusari | 709/227 |
| 7,590,705 B2 * | 9/2009 | Mathew et al. | 709/217 |
| 7,840,683 B2 * | 11/2010 | Zhang | 709/227 |
| 7,966,381 B2 * | 6/2011 | Fusari | 709/213 |
| 8,160,983 B2 * | 4/2012 | Fitzmaurice et al. | 706/45 |
| 2004/0085366 A1 * | 5/2004 | Foster et al. | 345/854 |
| 2005/0044301 A1 * | 2/2005 | Vasilevsky et al. | 711/1 |
| 2007/0005766 A1 * | 1/2007 | Singhal et al. | 709/225 |
| 2007/0006321 A1 * | 1/2007 | Bantz et al. | 726/27 |
| 2007/0150597 A1 * | 6/2007 | Hasan et al. | 709/226 |
| 2010/0131451 A1 * | 5/2010 | FitzMaurice et al. | 706/54 |
| 2012/0016977 A1 * | 1/2012 | Robertson et al. | 709/224 |

OTHER PUBLICATIONS

Strang, Thomas; Linnhoff-Popien, Claudea; "A Context Modeling Survey", In Workshop on Advanced Context Modelling, Reasoning and Management, UbiComp 2004—The Sixteh International Conference on Ubiquitous Computing, Nottingham/England, 2004, pp. 1-9.
Seliger, Robert; "Overview of HL7's CCOW Standard", http://www.hl7.org/library/Committees/sigvi/CCOW/CCOW_overview_2001.doc.

* cited by examiner

*Primary Examiner* — Aaron Strange
(74) *Attorney, Agent, or Firm* — Krishnendu Gupta; Joseph D'Angelo (57) ABSTRACT

User-context management techniques can be performed on a context server. The context server may receive user-context information from a client device. The context server may store the user-context information at a context repository in accordance with a particular context model and in accordance with a particular set of rules. Resources accessed by the client device may retrieve the user-context information.

21 Claims, 7 Drawing Sheets

USER-CONTEXT MANAGEMENT

FIELD OF THE DISCLOSURE

The present disclosure is generally related to context management.

BACKGROUND

A context is a set of information or events that surrounds a situation. Context management refers to frameworks and processes that coordinate the use of data between software applications. For example, multiple applications may use/require the same or similar information, such as login-related information. This information may need to be provided by a user of the application. The user may need to provide the information every time one of the software applications is accessed by the user. Context management allows users to provide the information once in a first application and have other applications gain access to the information. Thus, the need for a user to provided redundant information is reduced or eliminated.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

DETAILED DESCRIPTION

Conventional context management systems are not designed to operate within a data center or within a cloud-computing environment. Embodiments disclosed herein deviate from and improve upon conventional context management. Context may be described with respect to several aspects: spatial, social, personal, physical, system, information, and regulation. Context management may model user operations, user processes, user business activities, and user real-time locations, so that context-aware applications are more intelligent in addressing user concerns and context-aware IT solutions are simpler from a user perspective.

The present disclosure provides methods usable for performing user-context management. In a first particular embodiment, a method is performed by a context server. The context server receives user-context information from a client device. The user-context information is associated with a particular user of the client device. The context server stores the user-context information in a context repository in accordance with a particular context model and in accordance with a particular set of rules. The context server receives a context request from a resource accessed by the client device. The context request includes a request for at least a portion of the user-context information. In response to receiving the context request, the context server retrieves context information from the context repository in accordance with the particular set of rules and sends the retrieved context information to the resource access by the client device. The retrieved context information includes the at least a portion of the user-context information.

The present disclosure provides computer-readable storage media including instructions that, when executed by a system, enable the system to perform methods usable for performing user-context management. In a second particular embodiment, the methods include the method described above with respect to the first particular embodiment.

The present disclosure provides systems usable for performing user-context management. In a third particular embodiment, a system comprises a context repository, a context discoverer, a context manager, a rule engine, and a query manager. The context discoverer receives user-context information from a client device, wherein the user-context information is associated with a particular user of the client device. The context manager receives the user-context information from the context discoverer, stores the user-context information in the context repository in accordance with a particular context model and in accordance with a particular set of rules, and retrieves context information from the context repository in accordance with the particular set of rules. The rule engine enforces the particular set of rules. The query manager receives a context request from a resource accessed by the client device, communicates with the context manager to retrieve context information from the context repository, wherein the retrieved context information includes at least a portion of the user-context information, and sends the retrieved context information to the resource accessed by the client device.

Figure 1:
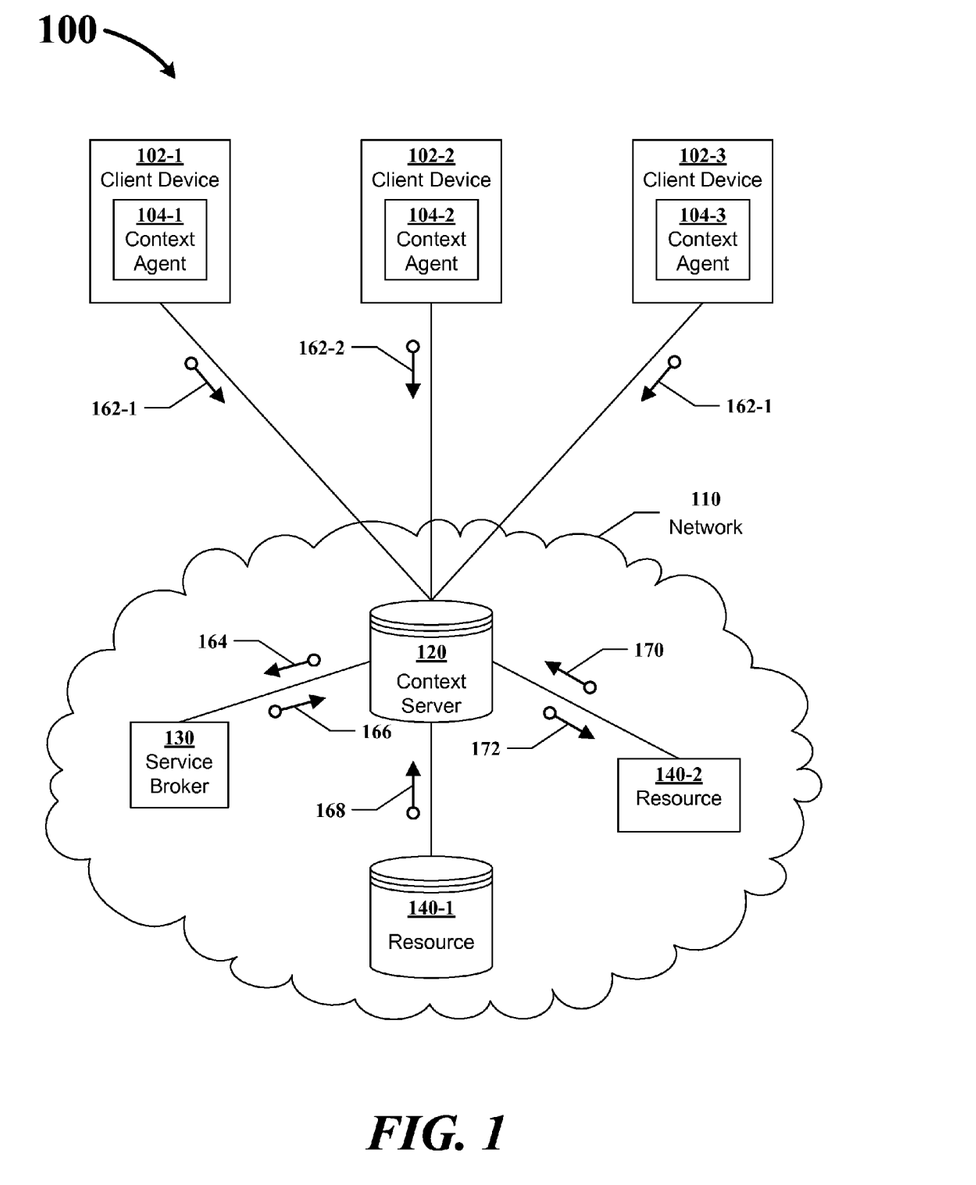
FIG. 1 shows a block diagram of an example embodiment of a first system including a context server.

FIG. 1 shows a block diagram of an example embodiment of a first system 100 including a context server 120. The system 100 also includes a network 110, client devices 102-1, 102-2, 102-3 (generally 102), a service broker 130, a first resource 140-1, and a second resource 140-2. The client devices 102 are communicatively coupled to the context server 120. Example client devices 102 include personal computers (e.g., a laptop computer) and mobile telephones. Each client device 102 includes a context agent 104 that collects user-context information associated with a user of the client device 102. In particular embodiments, the context agent 104 is a software application that is downloaded from the context server 120 to the client device 102. User-context information may include aspects such as spatial, social, personal, physical, system, informational, and regulation. The context server 120 may be communicatively coupled to a plurality of client devices 102.

The context server 120 is included with the network 110. In particular embodiments, one or more of the resources 140 are accessible to the client devices 102 via the network 110. The resources 140 may include software applications, for example. The network 110 may be a wide-area network (WAN), such as the Internet or a data center, for example. In a particular embodiment, the network 110 is a data center and the resources 140 are accessible to client devices 102 that access the data center. The context server 120 is communicatively coupled to the service broker 130, the first resource 140-1, and the second resource 140-2.

During operation, the context server 120 registers its context service(s) with the service broker 130. The resources 140 may request services available at the service broker 130. The resources 140 may find the context server's 120 information at the service broker 130 and then communicate directly with the context server 120. The context agent 104 collects first user-context information associated with a user of a client device 102. The context server 120 may receive the first user-context information 162 from the client device 102. The context server 120 may also receive second user-context information 168 associated with a user of the client device 102 from the first resource 140-1. The context server 120 stores received user-context information in a context repository at the context server 120. The context server 120 stores user-context information in accordance with a particular context model and in accordance with a particular set of rules.

The client device 102 may access the second resource 140-2. The context server 120 may receive a context request 170 from the second resource 140-2. In particular embodiments, the context request 170 includes a request for at least a portion of the user-context information associated with the user of the client device 102. The context server 120 may retrieve context information from the context repository in accordance with the particular set of rules. In particular embodiments, the retrieved context information includes the at least a portion of the user-context information associated with the user of the client device 102. The context server 120 may send the retrieved context information to the second resource 140-2.

Figure 2:
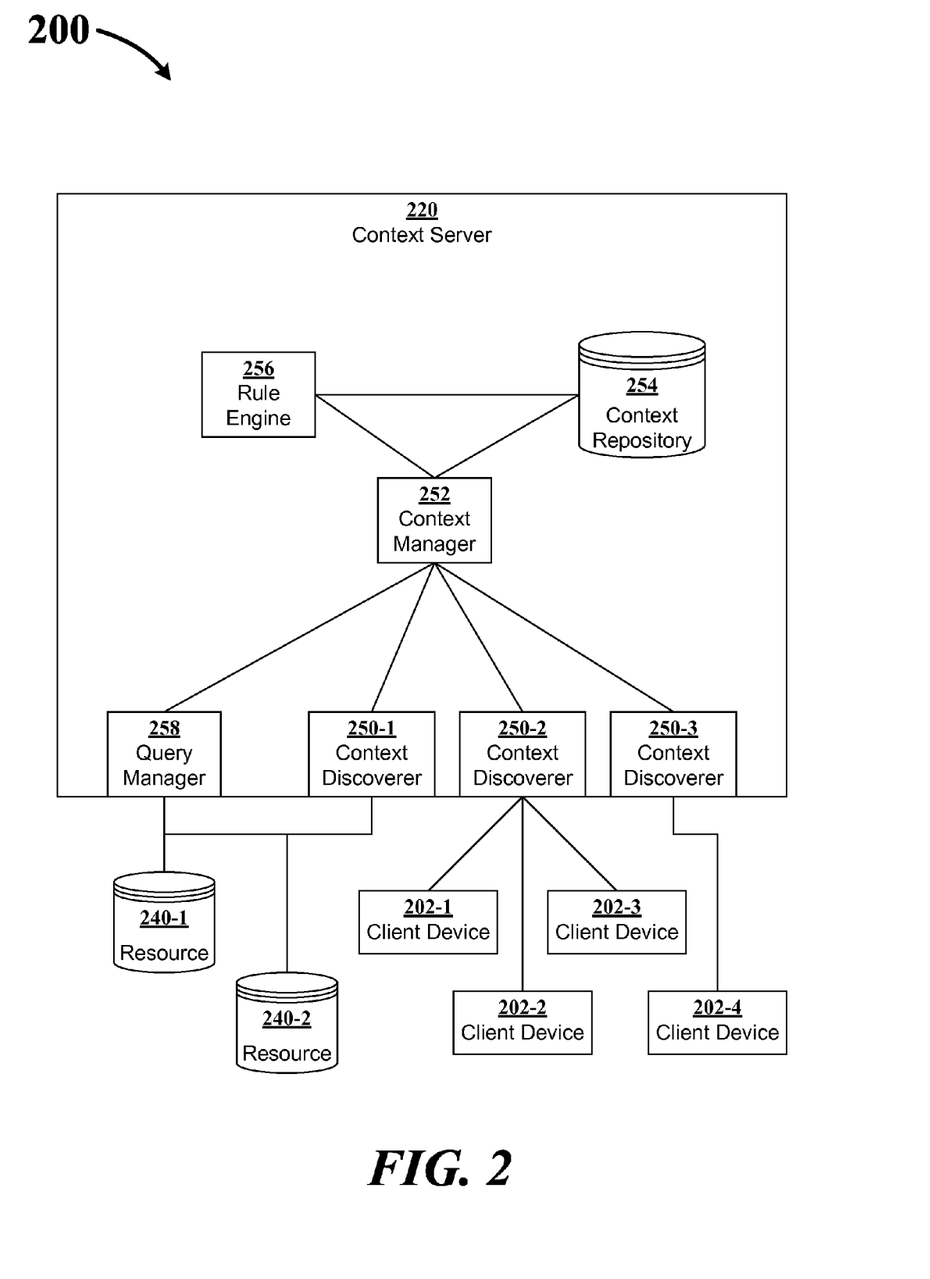
FIG. 2 shows a block diagram of an example embodiment of a second system including a context server.

FIG. 2 shows a block diagram of an example embodiment of a second system 200 including a context server 220. The system 200 also includes client devices 202-1, 202-2, 202-3, 202-4 (generally 202) and resources 240-1, 240-2 (generally 240). The client devices 202 may include one or more of the client devices 102 shown in FIG. 1. The client device 202 may be communicatively coupled to the context server 220. For example, a client device 202 may be communicatively coupled to the context server 120 via a network such as the network 110 shown in FIG. 1. A client device 202 may also be communicatively coupled (not specifically shown) to one or more resources 240. The resources 240 may be communicatively coupled to the context server 220. A resource 240 may be communicatively coupled to the context manager 252 or the query manager 258.

The context server 220 includes one or more context discoverers 250-1, 250-2, 250-3 (generally 250), a context manager 252, a context repository 254, a rule engine 256, and a query manager 258. In particular embodiments, a context discoverer 250 is a software module including instructions that, when executed, perform operations described herein. For example, a context discoverer 250 may be a thread of a process implementing the context manager 252. In particular embodiments, the software modules described herein are implemented so that a newer version of the module may be added to the context server 252 substantially without modifying other aspects of the context server 220. For example, the context discoverer 250 may be added to the context server 220 substantially without modifying other aspects of the context server 220 (e.g., the context manager 252, the context repository 254, the rule engine 256, and the query manager 258). Each context discoverer 250 may be communicatively coupled to a plurality of client devices 202. Each context discoverer 250 may receive user-context information from one or more client devices 202. The received user-context information may include the user-context information 162 shown in FIG. 1, for example. Each context discoverer 250 may be communicatively coupled to a plurality of resources 240. Each context discoverer 250 may receive user-context information from one or more resources 240. The received user-context information may include the user-context information 168 shown in FIG. 1, for example.

In particular embodiments, the context manager 252 is a software module including instructions that, when executed, perform operations described herein. The context manager 252 may be communicatively coupled to a plurality of context discoverers 250. The context manager 252 may receive user-context information from the context discovers 250. The context manager 252 stores the received user-context information in the context repository in accordance with a particular context model and in accordance with a particular set of rules. In particular embodiments, the context model indicates what types of user-context information may be collected and stored in the context repository 254. In particular embodiments, the context model provides structure to the stored user-context information. For example, the context model may determine how certain aspects of the user-context information may relate to other aspects of the user-context information. The context manager 220 also retrieves context information from the context repository 254 in accordance with the set of rules.

In particular embodiments, the rule engine 256 is a software module including instructions that, when executed, perform operations described herein. The rule engine 256 may enforce the particular set of rules. For example, certain resources 240 may be permitted to access certain aspects of user-context information (e.g., user name, user address) but not permitted to access other aspects of user-context information (e.g., user location, user phone number). The rule engine 256 may prevent a particular resource 240 or a particular client device 202 from reading or modifying aspects of user-context information that the particular resource 240 or particular client device 202 is not permitted to access. In particular embodiments, the rule engine 256 enforces structure and relationships defined by the context model. In a first particular embodiment, some or all of the rules are stored in the context repository 254. In a second particular embodiment, some or all of the rules are stored in the rule engine 256. In a third particular embodiment, some or all of the rules are encoded in instructions that, when executed, perform operations described herein.

In particular embodiments, the query manger 258 is a software module including instructions that, when executed, perform operations described herein. The query manger 258 may be communicatively coupled to a plurality of resources 240. The resources may include one or more of the resources 140 shown in FIG. 1, for example. For example, the query manager 258 may be communicatively coupled to the resources 240 via a network such as the network 110 shown in FIG. 1. The query manager 258 may receive context requests from one or more resources 240. The query manager 258 allows for scalability of the context server 252. In particular embodiments, the query manager 258 is communicatively coupled to a large number of resources 240 and may receive many context requests in a short amount of time or even simultaneously. This may happen, for example, in a cloud environment. In a particular embodiment, the query manger 258 receives one or more query requests from a resource 240 accessed by a client device 202. The one or more query requests may include the query requests 170 shown in FIG. 1, for example. Upon receiving a context request from a resource 240, the query manger 258 may communicate with the context manager 252 to retrieve context information from the context repository 254. In particular embodiments, the retrieved context information includes at least a portion of user-context information associated with a user of the client device 202. The query manager 258 may send the retrieved context information to the resource 240 accessed by the client device 202.

Figure 3:
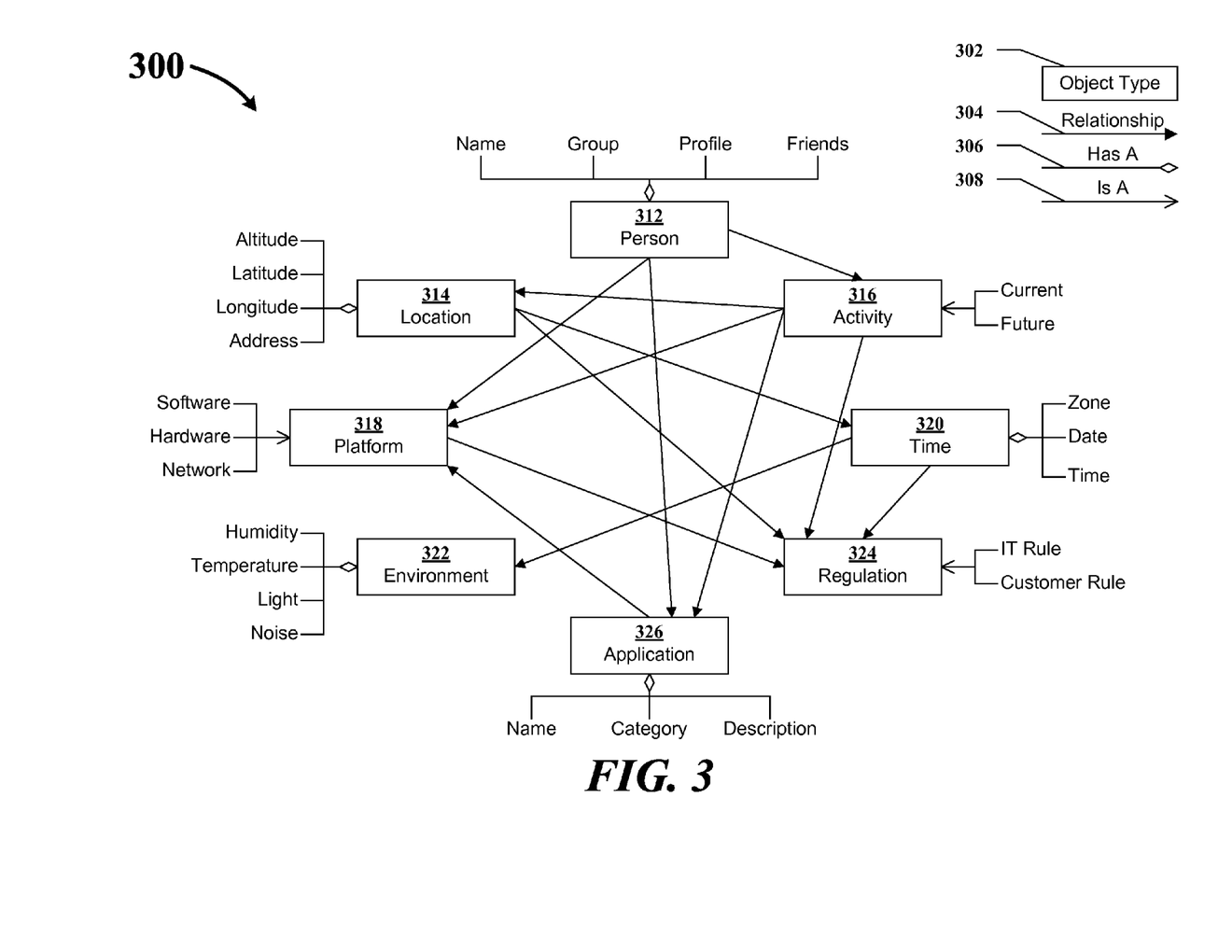
FIG. 3 shows a diagram of an example embodiment of a context model.

FIG. 3 shows a diagram of an example embodiment of a context model 300. The context model includes objects having an object type as indicated by the symbol 302. For example, context information stored in the context repository 254 shown in FIG. 2 may include objects of type Person 312, objects of type Location 314, objects of type Activity 316, objects of type Platform 318, objects of type Time 320, objects of type Environment 322, objects of type Regulation 324, and objects 326 of type Application. An object may have a relationship with another object as indicated by the symbol 304. For example, a person object 312 may have a relationship with an activity object 316, a platform object 318, and an application object 326. An object may have one or more particular attributes as indicated by the symbol 306. For example, a location object 314 may have an altitude attribute, a latitude attribute, a longitude attribute, and an address attribute. An object may be of a particular subtype as indicated by the symbol 308. For example, a platform object 318 may be a software platform, a hardware platform, or a network.

The context model 300 may be implemented using the Web Ontology Language (OWL). Other model languages may also be used to implement the context model 300. The context model 300 may be modified to meet particular needs in specific applications.

Figure 4:
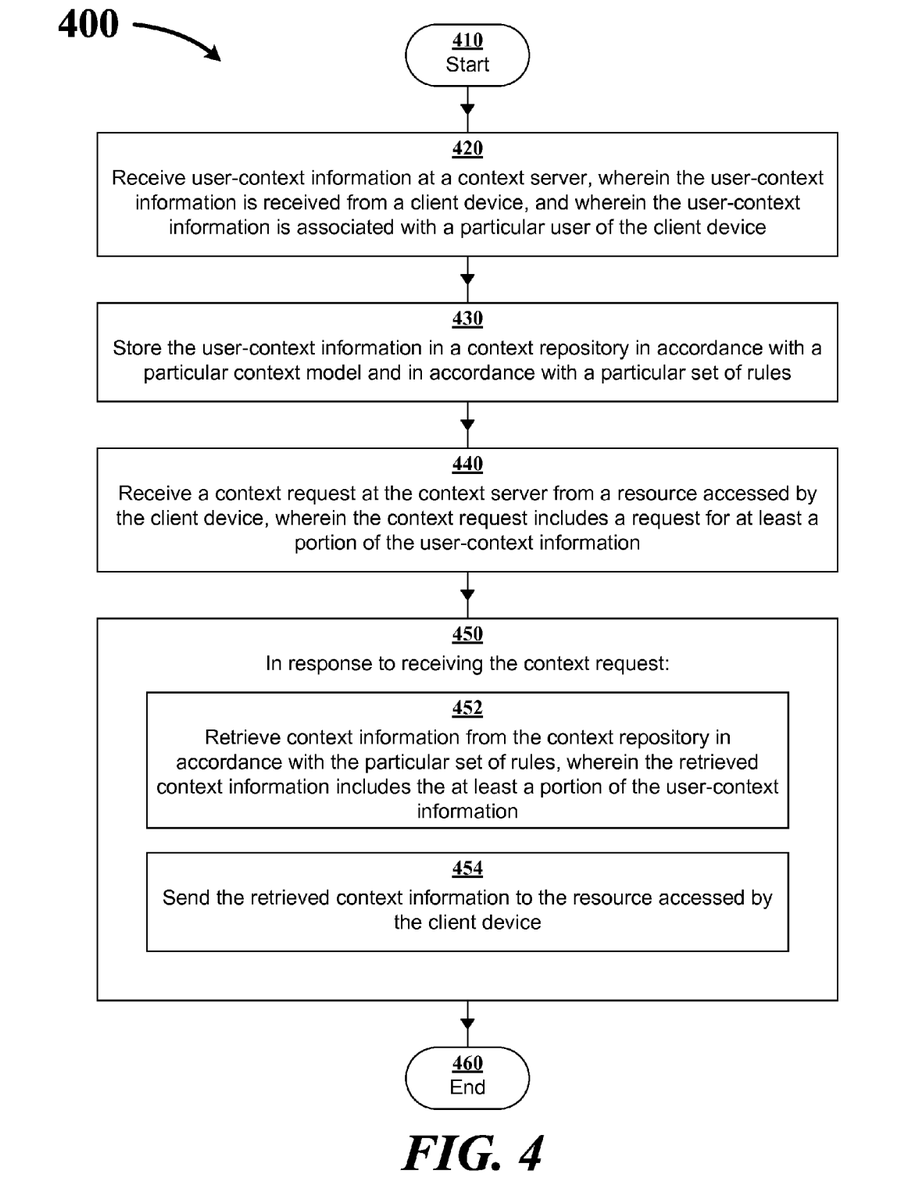
FIG. 4 shows a flow diagram of an example embodiment of a first method usable for performing user-context management.

FIG. 4 shows a flow diagram of an example embodiment of a first method 400 usable for performing user-context management. The first method 400 may be performed by a context server, such as the context server 120 shown in FIG. 1 or the context server 220 shown in FIG. 2. Although the flow diagram shows operations proceeding sequentially, an operation later in the sequence may start before a previous operation is completed.

The first method 400 starts at 410.

At 420, the context server receives user-context information from a client device. The client device may be one of the client devices 102 shown in FIG. 1 or one of the client devices 202 shown in FIG. 2. The user-context information is associated with a particular user of the client device. The user-context information may be the user-context information 162 shown in FIG. 1. In particular embodiments, the user-context information is received at the context server by a context discoverer such as the context discoverer shown in FIG. 2.

At 430, the context server stores the user-context information in a context repository. In particular embodiments, the context repository is at the context server. For example, the context repository may be the context repository 254 shown in FIG. 2. The user-context information is stored in the context repository in accordance with a particular context model and in accordance with a particular set of rules. In particular embodiments, the context model is the context model 300 shown in FIG. 3. In particular embodiments, the particular set of rules is enforced by a rule engine. The rule engine may be the rule engine 256 shown in FIG. 2, for example.

At 440, the context server receives a context request from a resource accessed by the client device. The context request includes a request for at least a portion of the user-context information associated with the particular user of the client device. For example, the resource may send the context request in order to provider higher-quality services to the particular user of the client device more efficiently. The resource may be one of the resources 140 shown in FIG. 1 or one of the resources 240 shown in FIG. 2. The context request may be the context request 170 shown in FIG. 1.

At 450, the context server responds to receiving the context request. The context server retrieves context information from the context repository in accordance with the particular set of rules, at 452. The retrieved context information includes the at least a portion of the user-context information. At 454, the context server sends the retrieved context information to the resource accessed by the client device. The context information sent to the resource may be the context information 172 shown in FIG. 2, for example.

At 460, the first method ends.

Figure 5:
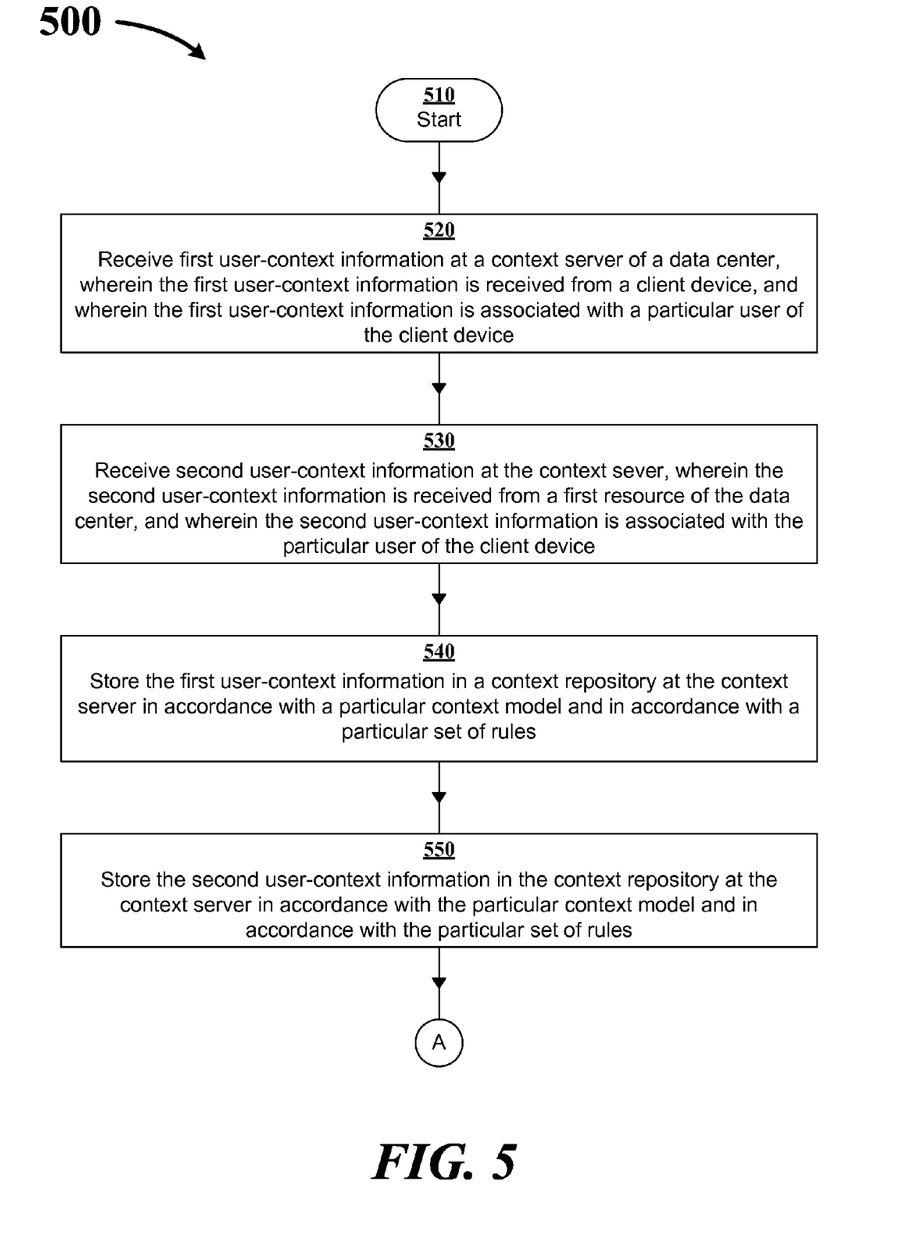
FIGS. 5-6 show a flow diagram of an example embodiment of a second method usable for performing user-context management.
Figure 6:
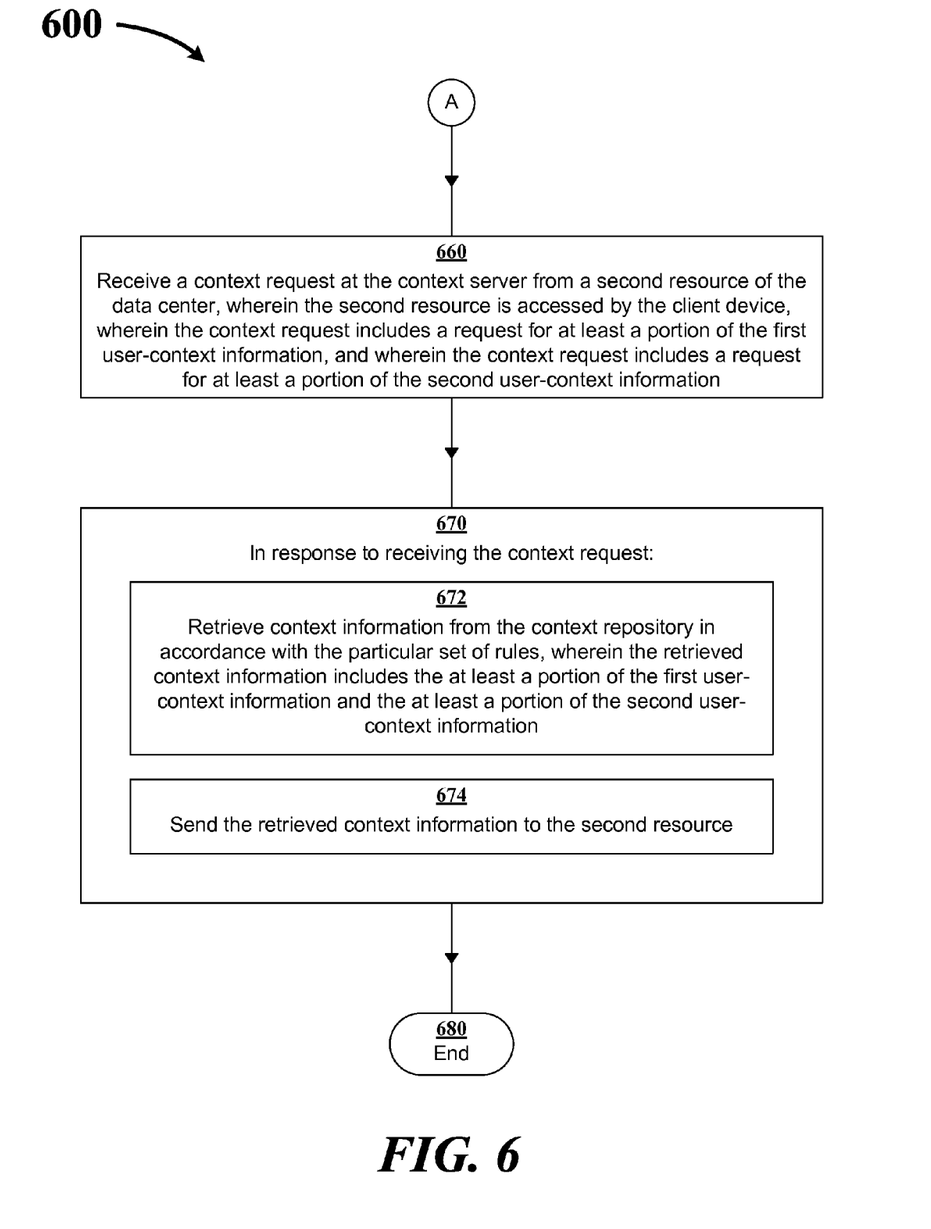

FIGS. 5-6 show a flow diagram of an example embodiment of a second method 500 usable for performing user-context management. The second method 500 may be performed by a context server at a data center. The context server may be the context server 120 shown in FIG. 1 or the context server 220 shown in FIG. 2. Although the flow diagram shows operations proceeding sequentially, an operation later in the sequence may start before a previous operation is completed. In other example embodiments, some of the operations may be performed accordance to a different sequence. For example, operation 530 may be performed before operation 520 and operation 550 may be performed before operation 540.

The second method starts at 510.

At 520, the context server receives first user-context information from a client device. The client device may be one of the client devices 102 shown in FIG. 1 or one of the client devices 202 shown in FIG. 2. The user-context information is associated with a particular user of the client device. The user-context information may be the user-context information 162 shown in FIG. 1. In particular embodiments, the first user-context information is received at the context server by a context discoverer such as the context discoverer shown in FIG. 2.

At 530, the context server receives second user-context information from a first resource of the data center. The first resource may be one of the resources 140 shown in FIG. 1 or one of the resources 240 shown in FIG. 2. The second user-context information is associated with the particular user of the client device. The second user-context information may be the user-context information 168 shown in FIG. 1. In particular embodiments, the second user-context information is received at the context server by a context discoverer such as the context discoverer shown in FIG. 2. In particular embodiments, operation 530 is performed before operation 520.

At 540, the context server stores the first user-context information in a context repository at the context server. For example, the context repository may be the context repository 254 shown in FIG. 2. The first user-context information is stored in the context repository in accordance with a particular context model and in accordance with a particular set of rules. In particular embodiments, the context model is the context model 300 shown in FIG. 3. In particular embodiments, the particular set of rules is enforced by a rule engine. The rule engine may be the rule engine 256 shown in FIG. 2, for example. In particular embodiments, operation 540 is performed before operation 530.

At 550, the context server stores the second user-context information in the context repository at the context server. The second user-context information is stored in the context repository in accordance with the particular context model and in accordance with the particular set of rules. In particular embodiments, operation 550 is performed before operation 540.

At 660, the context server receives a context request from a second resource of the data center. The second resource is accessed by the client device. The context request includes a request for at least a portion of the first user-context information associated with the particular user of the client device and a request for at least a portion of the second user-context information associated with the particular user of the client device. The resource may be one of the resources 140 shown in FIG. 1 or one of the resources 240 shown in FIG. 2. The context request may be the context request 170 shown in FIG. 1.

At 670, the context server responds to receiving the context request. The context server retrieves context information from the context repository in accordance with the particular set of rules, at 452. The retrieved context information includes the at least a portion of the first user-context information and the at least a portion of the second user-context information. At 454, the context server sends the retrieved context information to the second resource. The context information sent to the second resource may be the context information 172 shown in FIG. 2, for example.

At 690, the second method 500 ends.

Figure 7:
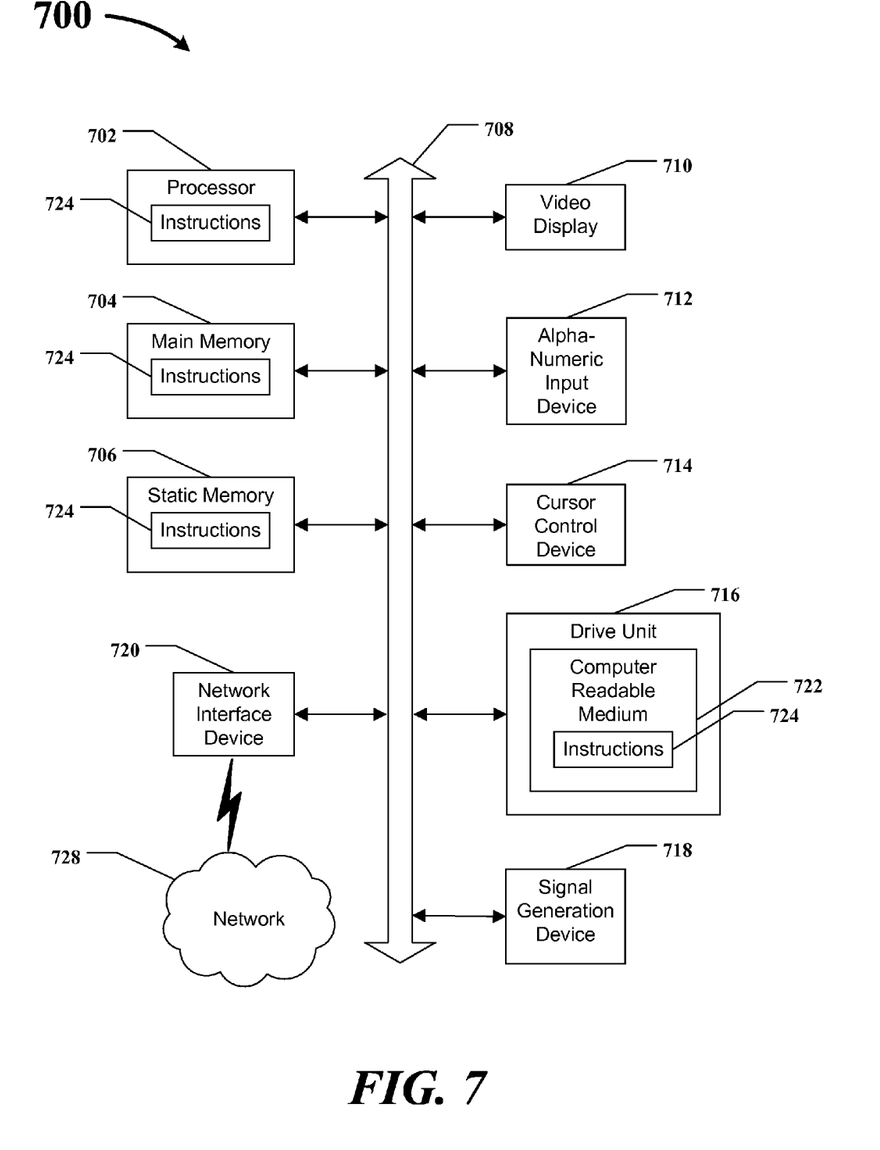
FIG. 7 shows a block diagram of an example embodiment of a general computer system.

FIG. 7 shows a block diagram of an example embodiment of a general computer system 700. The computer system 700 can include a set of instructions that can be executed to cause the computer system 700 to perform any one or more of the methods or computer-based functions disclosed herein. For example, the computer system 700 may include executable instructions to perform the methods discussed with respect to FIGS. 4-6. In particular embodiments, the computer system 700 includes executable instructions to implement the context server 120 shown in FIG. 1 or the context server 220 shown in FIG. 2. In a particular embodiment, the computer system 700 includes or is included within the context server 120 shown in FIG. 1 or the context server 220 shown in FIG. 2. The computer system 700 may be connected to other computer systems or peripheral devices via a network, such as the network 110 shown in FIG. 1. Additionally, the computer system 700 may include or be included within other computing devices.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), a projection television display, a flat panel display, a plasma display, or a solid state display. Additionally, the computer system 700 may include an input device 712, such as a remote control device having a wireless keypad, a keyboard, a microphone coupled to a speech recognition engine, a camera such as a video camera or still camera, or a cursor control device 714, such as a mouse device. The computer system 700 can also include a disk drive unit 716, a signal generation device 718, such as a speaker, and a network interface device 720. The network interface 720 enables the computer system 700 to communicate with other systems via a network 726. The network interface 720 may enable a context server to communicate with client devices 102 and resources 140 as shown in FIG. 1 or client devices 202 and resources 240 as shown in FIG. 2.

In a particular embodiment, as depicted in FIG. 7, the disk drive unit 716 may include a computer-readable medium 722 in which one or more sets of instructions 724, e.g. software, can be embedded. For example, one or more modules, such as the context discover 250, the context manager 252, the rule engine 256, and the query manger 258 shown in FIG. 1 can be embedded in the computer-readable medium 722. Further, the instructions 724 may embody one or more of the methods, such as the methods disclosed with respect to FIGS. 4-6, or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations, or combinations thereof.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

In the foregoing detailed description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the detailed description, with each claim standing on its own as defining separately claimed subject matter.

What is claimed is:

1. A method comprising:
receiving user-context information at a context discoverer at a data center from a client device, wherein the user-context information is associated with a particular user of the client device; wherein the context discoverer is enabled to receive user-context information selected from the group consisting of spatial, social, personal, physical, system, information, and regulation user-context information;
receiving the user-context information at a context manager from the context discoverer;
storing, via the context manager, the user-context information in a context repository in accordance with a particular context model; wherein the context model is selected from the group consisting of user operations, user processes, user business activities, user real-time locations models; and in accordance with a particular set of rules; wherein the particular context model comprises a spatial aspect, a social aspect, a personal aspect, a physical aspect, a system aspect, an information aspect, and a regulation aspect; and in response to a request for context information:
receiving, via a query manager, a context request from a resource accessed by the client device;
communicating, via a query manager, with the context manager to retrieve context information from the context repository, wherein the retrieved context information includes at least a portion of the user-context information;
retrieving context, via the context manager, information from the context repository in accordance with the particular set of rules according to a rule engine that enforces the particular set of rules; wherein the rules determine what portion of the user-context information is to be retrieved to be provided to the resource; and
sending the retrieved context information, via a query manager, to the resource accessed by the client device; wherein the content discoverer is communicatively coupled to a second resource; wherein the content discoverer receives user-context information from the second resource; and wherein the user-context information received from the second resource is stored in the context repository; wherein the information received from the client device is gathered by a context agent installed on the client device; wherein the context model includes a person object, a location object, a platform object, an environment object, an application object, an activity object, a time object, and regulation object and wherein each of the objects of the context model are enabled to have one or more relationships with other objects.

2. The method of claim 1, wherein the context server is included within a data center.

3. The method of claim 2, wherein the resource accessed by the client device is included within the data center.

4. The method of claim 2, wherein the data center is a virtualized data center comprising one or more virtual devices representing abstractions of one or more physical devices of a physical data center.

5. The method of claim 4, wherein the context server is a virtual machine comprising an abstraction of a plurality of physical compute resources wherein the abstraction of the compute resources do not directly correspond to the underlying physical compute resources.

6. The method of claim 1, further comprising:
receiving second user-context information at the context sever, wherein the second user-context information is received from a second resource, and wherein the second user-context information is associated with the particular user of the client device;
storing the second user-context information in the context repository at the context server in accordance with the particular context model and in accordance with the particular set of rules; wherein the particular context model comprises a spatial aspect, a social aspect, a personal aspect, a physical aspect, a system aspect, an information aspect, and a regulation aspect;
wherein the context request includes a request for at least a portion of the second user-context information; and
wherein the retrieved context information includes the at least a portion of the second user-context information.

7. The method of claim 6, wherein the context server, the resource accessed by the client device, and the second resource are included within a data center.

8. A non-transitory computer-readable storage medium including instructions that, when executed by a system, enable the system to perform a method comprising:
receiving user-context information at a context discoverer at a data center from a client device, wherein the user-context information is associated with a particular user of the client device; wherein the context discoverer is enabled to receive user-context information selected from the group consisting of spatial, social, personal, physical, system, information, and regulation user-context information;
receiving the user-context information at a context manager from the context discoverer;
storing, via the context manager, the user-context information in a context repository in accordance with a particular context model; wherein the context model is selected from the group consisting of user operations, user processes, user business activities, user real-time locations models; and in accordance with a particular set of rules; wherein the particular context model comprises a spatial aspect, a social aspect, a personal aspect, a physical aspect, a system aspect, an information aspect, and a regulation aspect; and in response to a request for context information:
receiving, via a query manager, a context request from a resource accessed by the client device;
communicating, via a query manager, with the context manager to retrieve context information from the context repository, wherein the retrieved context information includes at least a portion of the user-context information;
retrieving context, via the context manager, information from the context repository in accordance with the particular set of rules according to a rule engine that enforces the particular set of rules; wherein the rules determine what portion of the user-context information is to be retrieved to be provided to the resource; and
sending the retrieved context information, via a query manager, to the resource accessed by the client device; wherein the content discoverer is communicatively coupled to a second resource; wherein the content discoverer receives user-context information from the second resource; and wherein the user-context information received from the second resource is stored in the context repository; wherein the information received from the client device is gathered by a context agent installed on the client device; wherein the context model includes a person object, a location object, a platform object, an environment object, an application object, an activity object, a time object, and regulation object and wherein each of the objects of the context model are enabled to have one or more relationships with other objects.

9. The computer-readable storage medium of claim 8, wherein the context server is included in a data center comprising a plurality of resources and wherein the resource accessed by the client device is one resource of the plurality of resources; wherein the context model includes a person object, a location object, a platform object, an environment object, an application object, an activity object, a time object, and regulation object and wherein each objects of the context model are enabled to have one or more relationships with other objects.

10. The computer-readable storage medium of claim 9, wherein the data center is a virtualized data center comprising one or more virtual devices representing abstractions of one or more physical devices of a physical data center.

11. The computer-readable storage medium of claim 8, wherein the context server is a virtual machine comprising an abstraction of a plurality of physical compute resources wherein the abstraction of the compute resources do not directly correspond to the underlying physical compute resources.

12. The computer-readable storage medium of claim 8, wherein the method further comprises:
receiving second user-context information at the context sever, wherein the second user-context information is received from a second resource, and wherein the second user-context information is associated with the particular user of the client device;
storing the second user-context information in the context repository at the context server in accordance with the particular context model and in accordance with the particular set of rules;
wherein the context request includes a request for at least a portion of the second user-context information; and
wherein the retrieved context information includes the at least a portion of the second user-context information.

13. The computer-readable storage medium of claim 12, wherein the context server, the resource accessed by the client device, and the second resource are included within a data center.

14. A context server comprising:
a context repository;
a context discoverer that receives user-context information at a data center from a client device, wherein the user-context information is associated with a particular user of the client device; wherein the context discoverer is enabled to receive user-context information selected from the group consisting of spatial, social, personal, physical, system, information, and regulation user-context information;
a context manager that:
receives the user-context information from the context discoverer;
stores the user-context information in the context repository in accordance with a particular context model; wherein the context model is selected from the group consisting of user operations, user processes, user business activities, user real-time locations models; wherein the particular context model comprises a spatial aspect, a social aspect, a personal aspect, a physical aspect, a system aspect, an information aspect, and a regulation aspect; and in accordance with a particular set of rules; and
retrieves context information from the context repository in accordance with the particular set of rules;

a rule engine that enforces the particular set of rules; wherein the rules determine what portion of the user-context information is to be retrieved to be provided to the resource and a query manager that:

receives a context request from a resource accessed by the client device;

communicates with the context manager to retrieve context information from the context repository, wherein the retrieved context information includes at least a portion of the user-context information; and sends the retrieved context information to the resource accessed by the client device; wherein the content discoverer is communicatively coupled to a second resource; wherein the content discoverer receives user-context information from the second resource; and wherein the user-context information received from the second resource is stored in the context repository; wherein the resource uses a service broker to find the context server; wherein the context model includes a person object, a location object, a platform object, an environment object, an application object, an activity object, a time object, and regulation object and wherein each of the objects of the context model are enabled to have one or more relationships with other objects.

15. The context server of claim 14, wherein the context server is included within a data center.

16. The context server of claim 15, wherein the resource accessed by the client device is included within the data center.

17. The context server of claim 15, wherein the data center is a virtualized data center comprising one or more virtual devices representing abstractions of one or more physical devices of a physical data center.

18. The context server of claim 17, wherein the context server is a virtual machine comprising an abstraction of a plurality of physical compute resources wherein the abstraction of the compute resources do not directly correspond to the underlying physical compute resources.

19. The context server of claim 14, wherein:

the context discoverer receives second user-context information associated with the particular user of the client device, wherein the second user-context information is received from a second resource;

the context manager stores the second user-context information in the context repository in accordance with the particular context model and in accordance with the particular set of rules;

the context request includes a request for at least a portion of the second user-context information; and the retrieved context information includes the at least a portion of the second user-context information.

20. The context server of claim 19, wherein the context server, the resource accessed by the client device, and the second resource are included within a data center.

21. The apparatus of claim 14 further comprising a context model wherein the context model provides structure to the stored user-context information; wherein the context model includes a relationship between aspects of the user-context information.

* * * * *